3,049,519
EMULSION POLYMERIZATION IN THE PRESENCE OF A CATALYST COMPRISING AN ARYLCYCLOHEXANE HYDROPEROXIDE
William B. Reynolds, Bartlesville, Okla., assignor to Phillips Petroleum Company, a corporation of Delaware
No Drawing. Filed June 27, 1949, Ser. No. 101,676
11 Claims. (Cl. 260—84.1)

This invention relates to an improved process for polymerizing unsaturated organic compounds while dispersed in an aqueous emulsion. In one important aspect this invention relates to the use of faster recipes at low polymerization temperatures for effecting production of synthetic rubber by emulsion polymerization of conjugated diolefins.

With the increasing interest in low temperature emulsion polymerization, many variations in recipes and procedure have been developed in the interest of economy and efficiency in addition to the attention given to producing polymeric materials having the desired characteristics. Recipes of the redox type, that is, formulations wherein both oxidizing and reducing components are present, have been widely used. Oxidizing components frequently employed include materials of a peroxidic nature, and particularly compounds such as benzoyl peroxide and cumene hydroperoxide. Even though any peroxidic material might be expected to function in the capacity of the oxidant in a redox emulsion polymerization system, this is not necessarily the case since in some instances little, if any, polymerization occurs while in other cases with different peroxides the reaction takes place at a satisfactory rate. Some peroxides may function fairly satisfactorily at higher temperatures but are of little value when it is desired to carry out polymerizations at low temperatures, say below 0° C.

I have now discovered that greatly increased conversion rates are obtained when carrying out emulsion polymerization reactions at low temperatures using redox recipes if the oxidizing component employed is an arylcyclohexyl hydroperoxide, such as is formed upon reaction of free oxygen with a liquid arylcyclohexane. The simplest hydroperoxides of this series are phenylcyclohexane hydroperoxide and alpha and beta naphthylcyclohexane hydroperoxides, formed by bubbling free oxygen through these hydrocarbons. The hydroperoxide compositions not only give faster polymerization rates when used to effect emulsion polymerizations, but their use also frequently results in a more uniform reaction rate over a given reaction period than do hydroperoxides heretofore used. These advantages are particularly pronounced at polymerization temperatures below 10° C., and down to polymerization temperatures as low as −30 or −40° C., or lower.

An object of this invention is to polymerize unsaturated organic compounds while dispersed in an aqueous emulsion.

Another object of this invention is to provide an improved process for the production of synthetic rubber.

A further object of this invention is to shorten the reaction time necessary for the production of synthetic rubber by emulsion polymerization of monomeric materials.

Still another object of this invention is to produce synthetic rubber at a low reaction temperature.

Further objects and advantages of this invention will become apparent, to one skilled in the art, from the accompanying disclosure and discussion.

The hydroperoxide compositions used in the practice of this invention can easily be prepared by simple oxidation, with free oxygen, of the corresponding arylcyclohexane compound. The arylcyclohexane compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent arylcyclohexane compound, or unreacted arylcyclohexane compound may be stripped and the residual material employed. The major active ingredient in such a composition is the monohydroperoxide, or a mixture of monohydroperoxides. This hydroperoxide group appears to result from introduction of two oxygen atoms between the carbon atom of the cyclohexane ring which is directly attached to the aryl group and the single hydrogen atom attached thereto, and the usual method of production just outlined appears to produce only the monohydroperoxide, even in those instances where a dihydroperoxide appears to be structurally possible.

The hydroperoxides which are applicable in this invention can be represented by the formula

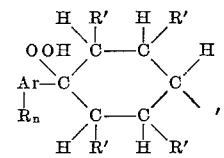

wherein Ar is an aryl nucleus, each R is a radical directly attached to a carbon atom of said aryl nucleus and is of the group consisting of alkyl, aryl, aralkyl, halogen, alkoxy, and aryloxy, with $n$ an integer not greater than four and the sum of the carbon atoms in $R_n$—Ar— not greater than sixteen, and each R' is of the group consisting of hydrogen, alkyl, aryl, aryloxy, alkoxy, and of tetramethylene for any two adjacent R' together, with the number of R' groups which are other than hydrogen not greater than four and the sum of the carbon atoms in the R' groups not greater than ten.

Examples of such hydroperoxides include phenylcyclohexane hydroperoxide (1-phenyl-1-hydroperoxycyclohexane), alpha naphthyl cyclohexane hydroperoxide [1-(1-naphthyl)-1-hydroperoxycyclohexane], the corresponding beta naphthyl compound, p-methoxyphenylcyclohexane hydroperoxide [1 - (4-methoxyphenyl)-1-hydroperoxy-cyclohexane], the corresponding p-phenoxyphenyl and p-chlorophenyl compounds, alpha and beta phenyl decalin hydroperoxides (1-phenyl-1-hydroperoxy-decahydronaphthalene, and 2-phenyl-2-hydroperoxy-decahydronaphthalene), and the like.

I use the hydroperoxides discussed herein as oxidants in polymerization recipes at low polymerization temperatures, i.e. from about 10° C., or just above the freezing point of water, to well below the freezing point of water, such as —40° C. or lower. The recipe will also include an activating-reductant compound or composition. In some recipes this will be a single compound, or a mixture of homologous compounds, such as hydrazine, ethylenediamine, diethylenetriamine, ethylene-methylethylene-triamine, tetraethylenepentamine, and the like. These compounds have the general formula

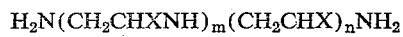

where each X is of the group consisting of hydrogen and methyl, $m$ is an integer between 0 and 8, inclusive, and $n$ is an integer of the group consisting of 0 and 1, and is 1 when $m$ is greater than 0. In other recipes a composition is used which comprises one compound which is an oxidation catalyst, or activator, and other different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphatae of an alkali metal, such as sodium or potassium.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

As previously stated, it is usually desirable that the multivalent metal be present in its lower valence state. With some recipes, it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in in its lower valence state when the activator solution is ready for addition to the polymerization mixture.

It is usually preferred that the multivalent ion be iron, and the activator solution may be prepared from any of the readily available soluble iron salts, such as ferrous sulfate, ferric sulfate, ferrous nitrate, and the like. A pyrophosphate of sodium or potassium is also usually used in preparing the activator solution. Apparently the ferrous salt and the pyrophosphate interreact to form some kind of a complex compound.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized as a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 180 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 percent, or more, of the alcohol present be in the aqueous phase. A high-boiling alcohol such as glycerine is difficult to recover from the resulting serum; a low-boiling alcohol such as methanol is easily removed and frequently preferred. Other low-boiling alcohols such as ethanol, however, are frequently too soluble in the liquid monomeric material to permit satisfactory operation. If the resulting latex tends to gell at low reaction temperatures, a larger proportion of aqueous phase should be used. It is generally preferred that the emulsion be of an "oil in water" type, with the ratio of aqueous medium to monomeric material between about 1.5:1 and about 2.75:1, in parts by weight. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 85 percent of the monomeric material is polymerized.

Emulsifying agents which are applicable in these low temperature polymerizations are materials such as potassium laurate, potassium oleate, and the like, and salts of rosin acids. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention. The amount and kind of emulsifier used to obtain optimum results is somewhat dependent upon the relative amounts of monomeric material and aqueous phase, the reaction temperature, and the other ingredients of the polymerization mixture. Usually an amount between about 1 and 5 parts per 100 parts of monomeric material will be found to be sufficient.

The pH of the aqueous phase may be varied over a rather wide range without producing deleterious effects on the conversion rate or the properties of the polymer. In general the pH may be within the range of 9.0 to 11.8, with the narrower range of 9.5 to 10.5 being most generally preferred.

The mercaptans applicable in this invention are usually alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

The amount of arylcyclohexane hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i.e. when the monomeric material is measured in pounds the arylcyclohexane hydroperoxide is measured in millipound mols. The same is true for other ingredients of the polymerization recipe. An optimum rate of polymerization is usually obtained with the amount of arylcyclohexane hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide, since it is promptly converted to the hydroperoxide by hydrolysis when the salt is admixed with the aqueous medium of the polymerization reaction mixture.

These hydroperoxides can be used, with outstanding results, in recipes incorporating any one of a number of activating or reducing ingredients. When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of heating the activator is by means of an air oven or other suitable arrangement for controlling the surrounding temperature. If the temperature of the oven is set at 60° C., for example, a period of heating ranging from 30 to 90 minutes may be employed, the time being governed by the temperature desired in the activator. Generally a period of about 40 minutes is required to raise the temperature of the activator mixture to 60° C. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is only slightly soluble in water and is one active form of ferrous ion and pyrophosphate which can be successfully used in my invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3,5, with a preferred ratio between 1:0.35 and 1:2.8.

Another preferred recipe includes an arylcyclohexane hydroperoxide and hydrazine or a polyethylenepolyamine as essential ingredients, as previously referred to herein, and as are illustrated by various examples hereinafter. In such recipes the amine-type compound used appears to act both as a reductant and as an activator, and no other activating ingredients, such as compounds of polyvalent-multivalent metals, or reducing ingredients, such as a reducing sugar, need be present in order to obtain satisfactory and rapid polymerization of the monomeric material, even at subfreezing temperatures. The amount of amine-type compound used to obtain optimum results also is dependent upon other ingredients in the recipe. Preferred results are usually obtained with between 0.1 to 5 parts by weight, per 100 parts of monomeric material, of the amine-type compound.

Advantages of this invention are illustrated by the following examples. The reactants, and their proportions, and the other specific ingredients of the recipes are presented as being typical and should not be construed to limit the invention unduly.

Example I

Phenylcyclohexane (100 parts) was oxidized by charging it to a reactor together with 0.7 part of the potassium salt of diisopropylbenzene hydroperoxide, this latter compound being employed as an initiator for the reaction. The temperature was adjusted to 125° C. and dry oxygen introduced over a 7.5-hour period while the mixture was stirred. The concentration of hydroperoxide at this point was 14.9 percent by weight. Portions of this material were used to supply the resulting phenylcyclohexane hydroperoxide, in the amounts indicated, as the oxidant in the following polymerization recipe:

| | Parts by weight |
|---|---|
| Butadiene | 72. |
| Styrene | 28. |
| Water, total | 180. |
| Rosin soap, potassium salt, pH 10* | 4.7. |
| Mercaptan blend ** | 0.25. |
| Phenylcyclohexane hydroperoxide | Variable. |
| Potassium hydroxide | 0.037. |
| Potassium chloride | 0.5. |
| Dextrose | 1.0. |
| Activator composition: | |
| $K_4P_2O_7$ | 0.165 (0.50 millimol). |
| $FeSO_4 \cdot 7H_2O$ | 0.14 (0.50 millimol). |
| Water to make 25 parts of solution. | |

* Dresinate 214.
** A blend of tertiary $C_{12}$, $C_{14}$, and $C_{16}$ aliphatic mercaptans in a ratio of 3:1:1 parts by weight.

The activator composition was prepared by heating a mixture of the ferrous sulfate, potassium pyrophosphate, and water at 60° C. for 20 minutes.

The dextrose, potassium hydroxide, and 25 parts water were heated at 70° C. for 25 minutes and added to the soap solution. The mercaptan dissolved in the styrene was then added, the temperature adjusted to the desired level, the butadiene introduced followed by the hydroperoxide, and finally the activator composition. Polymerization was effected at 5° C. The time-conversion data are recorded below together with the amounts of hydroperoxide employed. A control run was made using cumene hydroperoxide.

Example II

Phenylcyclohexane was oxidized to the hydroperoxide as in Example I and this material used in the following polymerization recipe at −10° C.:

| | Parts by weight |
|---|---|
| Butadiene | 70. |
| Styrene | 30. |
| Water (total) | 192. |
| Methanol | 48. |
| Rosin soap, potassium salt* | 3.5. |
| Fatty acid soap, potassium salt ** | 1.5. |
| Mercaptan blend * | 0.25. |
| Phenylcyclohexane hydroperoxide | 0.058 (0.3 millimol). |
| Activator composition: | |
| $FeSO_4 \cdot 7H_2O$ | 0.08 (0.3 millimol). |
| $Na_4P_2O_7 \cdot 10H_2O$ | 0.13 (0.3 millimol). |
| KCl | 0.25. |

* Same is in Example I.
** K–SF flakes.

The activator composition was prepared by heating a mixture of the ferrous sulfate, sodium pyrophosphate, potassium chloride, and water sufficient to make 25 parts of solution, to 60° C. for 40 minutes.

A parallel run was made in which 0.3 millimol cumene hydroperoxide was substituted for the phenylcyclohexane hydroperoxide. The results of both runs are tabulated below.

| Hydroperoxide | Mol ratio hydroperoxide/Fe++ | Conversion, percent | | |
|---|---|---|---|---|
| | | 4.0 hrs. | 7.0 hrs. | 24.0 hrs. |
| Phenylcyclohexane | 1:1 | 27 | 45 | 87 |
| Cumene | 1:1 | 10 | 18 | 48 |

Example III

A series of runs was made using the recipe of Example II at the 0.3 millimol activator level except that the mol ratio of phenylcyclohexane hydroperoxide to iron was varied. The following results were obtained:

| Mol ratio hydroperoxide/Fe++ | Conversion, percent | | | |
|---|---|---|---|---|
| | 2.0 hrs. | 4.0 hrs. | 7.0 hrs. | 24.0 hrs. |
| 0.75:1 | 10 | 21 | 35 | 77 |
| 1.0 :1 | 10 | 22 | 36 | 76 |
| 1.1 :1 | 11 | 22 | 37 | 75 |
| 1.25:1 | 9 | 20 | 35 | 75 |
| 1.5 :1 | 10 | 21 | 35 | 75 |
| 2.0 :1 | 10 | 21 | 34 | 74 |

Example IV

Phenylcyclohexane hydroperoxide was employed as the oxidant in the following polymerization recipe in

| Hydroperoxide | | | $FeSO_4 \cdot 7H_2O$ parts | Mols hydroperoxide to Mol Fe++ | Conversion, percent | | |
|---|---|---|---|---|---|---|---|
| Type | Parts | Millimols | | | 2 hrs. | 5 hrs. | 7 hrs. |
| Phenylcyclohexane | 0.048 | 0.25 | 0.14 | 0.5 | 6.8 | 14.7 | 15.6 |
| Do | 0.072 | 0.37 | 0.14 | 0.75 | 22.1 | 58.0 | 74.3 |
| Do | 0.144 | 0.75 | 0.14 | 1.5 | 14.6 | 40.8 | 62.9 |
| Cumene | 0.1 | 0.66 | 0.14 | 1.3 | 8.3 | 22.1 | 31.6 | aqueous phase should be used. It is generally preferred that the emulsion be of an "oil in water" type, with the ratio of aqueous medium to monomeric material between about 1.5:1 and about 2.75:1, in parts by weight. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 85 percent of the monomeric material is polymerized.

Emulsifying agents which are applicable in these low temperature polymerizations are materials such as potassium laurate, potassium oleate, and the like, and salts of rosin acids. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention. The amount and kind of emulsifier used to obtain optimum results is somewhat dependent upon the relative amounts of monomeric material and aqueous phase, the reaction temperature, and the other ingredients of the polymerization mixture. Usually an amount between about 1 and 5 parts per 100 parts of monomeric material will be found to be sufficient.

The pH of the aqueous phase may be varied over a rather wide range without producing deleterious effects on the conversion rate or the properties of the polymer. In general the pH may be within the range of 9.0 to 11.8, with the narrower range of 9.5 to 10.5 being most generally preferred.

The mercaptans applicable in this invention are usually alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

The amount of arylcyclohexane hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i.e. when the monomeric material is measured in pounds the arylcyclohexane hydroperoxide is measured in millipound mols. The same is true for other ingredients of the polymerization recipe. An optimum rate of polymerization is usually obtained with the amount of arylcyclohexane hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide, since it is promptly converted to the hydroperoxide by hydrolysis when the salt is admixed with the aqueous medium of the polymerization reaction mixture.

These hydroperoxides can be used, with outstanding results, in recipes incorporating any one of a number of activating or reducing ingredients. When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of heating the activator is by means of an air oven or other suitable arrangement for controlling the surrounding temperature. If the temperature of the oven is set at 60° C., for example, a period of heating ranging from 30 to 90 minutes may be employed, the time being governed by the temperature desired in the activator. Generally a period of about 40 minutes is required to raise the temperature of the activator mixture to 60° C. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is only slightly soluble in water and is one active form of ferrous ion and pyrophosphate which can be successfully used in my invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3,5, with a preferred ratio between 1:0.35 and 1:2.8.

Another preferred recipe includes an arylcyclohexane hydroperoxide and hydrazine or a polyethylenepolyamine as essential ingredients, as previously referred to herein, and as are illustrated by various examples hereinafter. In such recipes the amine-type compound used appears to act both as a reductant and as an activator, and no other activating ingredients, such as compounds of polyvalent-multivalent metals, or reducing ingredients, such as a reducing sugar, need be present in order to obtain satisfactory and rapid polymerization of the monomeric material, even at subfreezing temperatures. The amount of amine-type compound used to obtain optimum results also is dependent upon other ingredients in the recipe. Preferred results are usually obtained with between 0.1 to 5 parts by weight, per 100 parts of monomeric material, of the amine-type compound.

Advantages of this invention are illustrated by the following examples. The reactants, and their proportions, and the other specific ingredients of the recipes are presented as being typical and should not be construed to limit the invention unduly.

*Example I*

Phenylcyclohexane (100 parts) was oxidized by charging it to a reactor together with 0.7 part of the potassium salt of diisopropylbenzene hydroperoxide, this latter compound being employed as an initiator for the reaction. The temperature was adjusted to 125° C. and dry oxygen introduced over a 7.5-hour period while the mixture was stirred. The concentration of hydroperoxide at this point was 14.9 percent by weight. Portions of this material were used to supply the resulting phenylcyclohexane hydroperoxide, in the amounts indicated, as the oxidant in the following polymerization recipe:

| | Parts by weight |
|---|---|
| Butadiene | 72. |
| Styrene | 28. |
| Water, total | 180. |
| Rosin soap, potassium salt, pH 10* | 4.7. |
| Mercaptan blend ** | 0.25. |
| Phenylcyclohexane hydroperoxide | Variable. |
| Potassium hydroxide | 0.037. |
| Potassium chloride | 0.5. |
| Dextrose | 1.0. |
| Activator composition: | |
| $K_4P_2O_7$ | 0.165 (0.50 millimol). |
| $FeSO_4.7H_2O$ | 0.14 (0.50 millimol). |
| Water to make 25 parts of solution. | |

* Dresinate 214.
** A blend of tertiary $C_{12}$, $C_{14}$, and $C_{16}$ aliphatic mercaptans in a ratio of 3 : 1 : 1 parts by weight.

The activator composition was prepared by heating a mixture of the ferrous sulfate, potassium pyrophosphate, and water at 60° C. for 20 minutes.

The dextrose, potassium hydroxide, and 25 parts water were heated at 70° C. for 25 minutes and added to the soap solution. The mercaptan dissolved in the styrene was then added, the temperature adjusted to the desired level, the butadiene introduced followed by the hydroperoxide, and finally the activator composition. Polymerization was effected at 5° C. The time-conversion data are recorded below together with the amounts of hydroperoxide employed. A control run was made using cumene hydroperoxide.

*Example II*

Phenylcyclohexane was oxidized to the hydroperoxide as in Example I and this material used in the following polymerization recipe at −10° C.:

| | Parts by weight |
|---|---|
| Butadiene | 70. |
| Styrene | 30. |
| Water (total) | 192. |
| Methanol | 48. |
| Rosin soap, potassium salt* | 3.5. |
| Fatty acid soap, potassium salt ** | 1.5. |
| Mercaptan blend * | 0.25. |
| Phenylcyclohexane hydroperoxide | 0.058 (0.3 millimol). |
| Activator composition: | |
| $FeSO_4.7H_2O$ | 0.08 (0.3 millimol). |
| $Na_4P_2O_7.10H_2O$ | 0.13 (0.3 millimol). |
| KCl | 0.25. |

* Same is in Example I.
** K-SF flakes.

The activator composition was prepared by heating a mixture of the ferrous sulfate, sodium pyrophosphate, potassium chloride, and water sufficient to make 25 parts of solution, to 60° C. for 40 minutes.

A parallel run was made in which 0.3 millimol cumene hydroperoxide was substituted for the phenylcyclohexane hydroperoxide. The results of both runs are tabulated below.

| Hydroperoxide | Mol ratio hydroperoxide/Fe++ | Conversion, percent | | |
|---|---|---|---|---|
| | | 4.0 hrs. | 7.0 hrs. | 24.0 hrs. |
| Phenylcyclohexane | 1:1 | 27 | 45 | 87 |
| Cumene | 1:1 | 10 | 18 | 48 |

*Example III*

A series of runs was made using the recipe of Example II at the 0.3 millimol activator level except that the mol ratio of phenylcyclohexane hydroperoxide to iron was varied. The following results were obtained:

| Mol ratio hydroperoxide/Fe++ | Conversion, percent | | | |
|---|---|---|---|---|
| | 2.0 hrs. | 4.0 hrs. | 7.0 hrs. | 24.0 hrs. |
| 0.75:1 | 10 | 21 | 35 | 77 |
| 1.0 :1 | 10 | 22 | 36 | 76 |
| 1.1 :1 | 11 | 22 | 37 | 75 |
| 1.25:1 | 9 | 20 | 35 | 75 |
| 1.5 :1 | 10 | 21 | 35 | 75 |
| 2.0 :1 | 10 | 21 | 34 | 74 |

*Example IV*

Phenylcyclohexane hydroperoxide was employed as the oxidant in the following polymerization recipe in

| Hydroperoxide | | | $FeSO_4.7H_2O$ parts | Mols hydroperoxide to Mol Fe++ | Conversion, percent | | |
|---|---|---|---|---|---|---|---|
| Type | Parts | Millimols | | | 2 hrs. | 5 hrs. | 7 hrs. |
| Phenylcyclohexane | 0.048 | 0.25 | 0.14 | 0.5 | 6.8 | 14.7 | 15.6 |
| Do | 0.072 | 0.37 | 0.14 | 0.75 | 22.1 | 58.0 | 74.3 |
| Do | 0.144 | 0.75 | 0.14 | 1.5 | 14.6 | 40.8 | 62.9 |
| Cumene | 0.1 | 0.66 | 0.14 | 1.3 | 8.3 | 22.1 | 31.6 | which tetraethylenepentamine was used as the activator:

| | Parts by weight |
|---|---|
| Butadiene | 70. |
| Styrene | 30. |
| Water | 180. |
| Soap flakes, pH 10.3 | 5.0. |
| Potassium chloride | 0.4. |
| Mercaptan blend * | 0.1. |
| Phenylcyclohexane hydroperoxide | 0.435 (2.27 millimols). |
| Tetraethylenepentamine | 1.5 (7.9 millimols). |

* A blend of tertiary $C_{12}$, $C_{14}$, and $C_{16}$ aliphatic mercaptans in a ratio of 3 : 1 : 1 parts by weight.

A solution of the emulsifier in water was prepared, the potassium chloride added, and potassium hydroxide introduced in sufficient quantity to give a pH of 10.3. A solution of the hydroperoxide and mercaptan in styrene was prepared and charged to the emulsifier solution after which the butadiene was introduced and the reactor pressured to 30 pounds per square inch gauge with nitrogen. The reactor contents were then brought to a temperature of 5° C. and an aqueous solution of the tetraethylenepentamine injected. The mixture was agitated throughout the reaction and the temperature maintained at 5° C. A conversion of 84 percent was reached in 2.9 hours.

Example V

Two additional polymerization runs were made using the recipe of Example IV with 0.384 part (2.0 millimols) phenylcyclohexane hydroperoxide and variable amounts of tetraethylenepentamine. The charging procedure described in Example I was followed and polymerization was effected at 5° C. The following time-conversion data were obtained:

| Phenylcyclohexane hydroperoxide | | Tetraethylene- pentamine | | Time, hours | Conversion, percent |
|---|---|---|---|---|---|
| Parts | Millimols | Parts | Millimols | | |
| 0.384 | 2.0 | 0.748 | 3.96 | 3.5 | 78 |
| 0.384 | 2.0 | 0.998 | 5.28 | 3.25 | 81 |

Example VI

Several amine-type activating compounds were employed to the extent of 4.0 millimols each in a series of polymerization runs using the recipe of Example IV. In each case the amount of phenylcyclohexane hydroperoxide used was 0.384 part (2.0 millimols). Polymerizations were effected at 5° C. The following results were obtained.

| Activator | Time, hours | Conversion, percent |
|---|---|---|
| 2,2'-dipyridyl | 67 | 41 |
| p,p'-Tetramethyldiaminodiphenyl methane | 67 | 11 |
| o-Phenanthroline | 26 | 12 |
| Acetoacetanilide | 43 | 23 |
| Dimethylaniline | 43 | 16 |
| Alanine | 43 | 4 |
| Morpholine | 43 | 5 |
| Ethylmorpholine | 43 | 11 |

As a contrast between the high polymerization rates which can be effected with arylcyclohexane hydroperoxides and other cyclohexane hydroperoxides, the following data of Example VII, obtained with methylcyclohexane hydroperoxide can be contrasted with the data of Example I.

Example VII

| | Parts by weight |
|---|---|
| Butadiene | 72. |
| Styrene | 28. |
| Water, total | 180. |
| Rosin soap, potassium salt, pH 10 * | 4.7. |
| Mercaptan blend ** | 0.25. |
| Methylcyclohexane hydroperoxide | Variable. |
| Potassium hydroxide | 0.037. |
| Potassium chloride | 0.5. |
| Dextrose | 1.0. |
| Activator composition: | |
| $FeSO_4 \cdot 7H_2O$ | 0.14. |
| $K_4P_2O_7$ | 0.16. |
| $H_2O$ | 5.0. |

* Dresinate 214.
** A blend of tertiary $C_{12}$, $C_{14}$, and $C_{16}$ aliphatic mercaptans in a ratio of 3 : 1 : 1 parts by weight.

The activator composition was prepared by heating a mixture of the ferrous sulfate, potassium pyrophosphate, and water at 60° C. for 20 minutes.

Polymerization was effected at 5° C. The results are tabulated below.

| Methylcyclohexane hydroperoxide | | $FeSO_4 \cdot 7H_2O$ | | Mols hydroperoxide to mol $Fe^{++}$ | Conversion, percent | |
|---|---|---|---|---|---|---|
| Part | Millimol | Part | Millimol | | 2 hrs. | 7 hrs. |
| 0.0328 | 0.25 | 0.14 | 0.5 | 0.5 | 6.2 | 28 |
| 0.0491 | 0.375 | 0.14 | 0.5 | 0.75 | 5.1 | 30.6 |
| 0.0982 | 0.75 | 0.14 | 0.5 | 1.5 | 4.2 | 22.1 |

Similarly the following data of Example VIII can be contrasted with the data of Example II.

Example VIII

| | Parts by weight |
|---|---|
| Butadiene | 70 |
| Styrene | 30 |
| Water, total | 153 |
| Methanol | 27 |
| Potassium oleate | 5.0 |
| Mercaptan blend * | 0.25 |
| Sodium sulfate | 0.3 |
| Methylcyclohexane hydroperoxide | Variable |
| Activator composition ** | 14 |

*Same as in other runs.
**5.0 g. $Na_4P_2O_7 \cdot 10H_2O$ and 2.22 g. $FeSO_4 \cdot 7H_2O$ in 100 ml. water heated at 60° C. for 40 minutes.

The methylcyclohexane hydroperoxide was employed as a 11 percent solution (by weight) in benzene. Polymerization was effected in the conventional manner with the temperature being maintained at −10° C. The results are presented below.

| Methylcyclohexane hydroperoxide, 100% basis, parts: | Conversion, percent 16.3 hours |
|---|---|
| 0.09 | 9.4 |
| 0.17 | 25.8 |
| 0.34 | 33.3 |
| 0.52 | 27.0 |
| 0.69 | 25.7 |

Example IX

Tetralin hydroperoxide was prepared by low-temperature oxidation of tetraline and used as the oxidant in the following recipe at 5° C.:

| | Parts by weight |
|---|---|
| Butadiene | 70 |
| Styrene | 30 |
| Water, total | 180 |
| Rosin soap, sodium salt * | 4.7 |
| Mercaptan blend ** | 0.21 |
| Sodium hydroxide | 0.1 |
| Trisodium phosphate, $Na_3PO_4.12H_2O$ | 0.5 |
| Tetralin hydroperoxide | Variable |
| Activator composition | Variable |

*Dresinate 731.
**Same as in other runs.

The following ingredients were used in the indicated proportions to make up the activator solution:

| | Parts by weight |
|---|---|
| Dextrose | 3.0 |
| $FeSO_4.7H_2O$ | 0.1 |
| $Na_4P_2O_7$, anhydrous | 0.6 |
| Water | 15.0 |

The effect of variable amounts of the activator solution on polymerizations initiated by tetralin hydroperoxide at 5° C. are shown in the following tabulation:

| Activator solution, parts | Tetralin hydroperoxide, parts | Conversion, percent | |
|---|---|---|---|
| | | 16 hrs. | 18 hrs. |
| 9.5 | 0.14 | 6.0 | 7.8 |
| 19.0 | 0.14 | 18.3 | 20.6 |
| 28.5 | 0.14 | 0 | 0.4 |

The effect of variable amounts of tetralin hydroperoxide on polymerizations conducted at 5° C., using the recipe given above, is shown in the following tabulation:

| Tetralin hydroperoxide, parts | Activator solution, parts | Conversion, percent | |
|---|---|---|---|
| | | 16 hrs. | 18 hrs. |
| 0.16 | 19.0 | 9.0 | --- |
| 0.32 | 19.0 | 28.7 | 32.2 |
| 0.48 | 19.0 | 25.7 | 27.9 |

Although it might be considered that some structural similarity exists between tetralin hydroperoxide and phenylcyclohexane hydroperoxide, it will be seen from a comparison of the foregoing results with other examples, such as Example I, that very much faster reaction rates are obtained when phenylcyclohexane hydroperoxide is used as the oxidant.

As will be evident to those skilled in the art, various modifications of this invention can be made, or followed, in the light of the foregoing disclosure and discussion, without departing from the spirit or scope of the disclosure or from the scope of the claims.

I claim:

1. In a process for producing a solid polymeric product by polymerizing a conjugated diolefin in aqueous emulsion in the presence of an organic hydroperoxide as an oxidizing constituent of a polymerization catalyst composition which also comprises a reducing component, the improvement which comprises effecting said polymerization at a reaction temperature below 10° C. using a phenylcyclohexane hydroperoxide prepared by oxidation with free oxygen of phenylcyclohexane as said organic hydroperoxide.

2. An improved process for producing synthetic rubber, which comprises establishing and maintaining at a polymerization temperature not higher than 10° C. an emulsion of an aqueous phase, a liquid monomeric material comprising a major amount of 1,3-butadiene and a minor amount of styrene, an emulsifying agent, a reaction modifier, an oxidation catalyst comprising a pyrophosphate of a multivalent metal capable of existing in two valence states, and 1-phenyl-1-hydroperoxycyclohexane.

3. An improved process for producing synthetic rubber, which comprises establishing and maintaining at a polymerization temperature not higher than 10° C. an emulsion of an aqueous phase, a liquid monomeric material comprising a major amount of 1,3-butadiene and a minor amount of styrene, an emulsifying agent, a reaction modifier, 1-phenyl-1-hydroperoxycyclohexane in an amount between 0.1 and 10 millimols, and 0.1 to 5 parts of tetraethylenepentamine, said amounts being per 100 parts by weight of said monomeric material.

4. In the polymerization of a monomeric material comprising a compound having an active $CH_2=C<$ group at a polymerization temperature not greater than 10° C. while dispersed in an aqueous emulsion in the presence of an oxidant and an activating-reducing composition, the improvement which comprises using as said oxidant 0.1 to 10 millimols, per 100 parts by weight of said monomeric material, of 1-phenyl-1-hydroperoxycyclohexane.

5. An improved process for producing synthetic rubber, which comprises establishing and maintaining at a polymerization temperature not higher than 10° C. an emulsion of an aqueous phase, a liquid monomeric material comprising a major amount of 1,3-butadiene and a minor amount of styrene, an emulsifying agent, a reaction modifier, 1-phenyl-1-hydroperoxycyclohexane in an amount between 0.1 and 10 millimols, and 0.1 to 5 parts of a polyamine having the formula

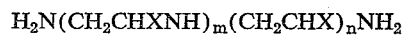

$$H_2N(CH_2CHXNH)_m(CH_2CHX)_nNH_2$$

where each X is of the group consisting of hydrogen and methyl, $m$ is an integer between 0 and 8, inclusive, and $n$ is an integer of the group consisting of 0 and 1 and is 1 when m is greater than 0, said amounts being per 100 parts by weight of said monomeric material.

6. An improved process for producing synthetic rubber, which comprises establishing and maintaining at a polymerization temperature not higher than 10° C. an emulsion of an aqueous phase, a liquid monomeric material comprising a major amount of 1,3-butadiene and a minor amount of styrene, an emulsfiying agent, a reaction modifier, a phenylcyclohexane hydroperoxide prepared by oxidation with free oxygen of phenylcyclohexane in an amount between 0.1 and 10 millimols, and 0.1 to 5 parts of an activating-reducing composition, said amounts being per 100 parts by weight of said monomeric material.

7. A process for polymerizing a monomeric material comprising a major amount of a conjugated diene having four to six carbon atoms per molecule, which comprises establishing and maintaining at a ploymerization temperature not higher than 10° C. an emulsion of an aqueous phase, such a monomeric material, an emulsifying agent, a phenylcyclohexane hydroperoxide prepared by oxidation with free oxygen of phenylcyclohexane in an amount between 0.1 and 10 millimols, and 0.1 to 5 parts of tetraethylenepentamine, said amounts being per 100 parts by weight of said monomeric material.

8. A process for polymerizing a monomeric material comprising an unsaturated organic compound having an active $CH_2=C<$ group and polymerizable when emulsified in an aqueous medium, which comprises establishing and maintaining at a polymerization temperature not higher than 10° C. an emulsion of an aqueous phase, such a monomeric material, an emulsifying agent, 1-phenyl-1-hydroperoxcyclohexane in an amount between 0.1 and 10 millimols, and 0.1 to 5 parts of tetraethylenepentamine, said amounts being per 100 parts by weight of said monomeric material.

9. A process for polymerizing a monomeric material comprising an unsaturated organic compound having an active $CH_2=C<$ group and polymerizable when emulsified in an aqueous medium, which comprises establishing and maintaining at a polymerization temperature not higher than 10° C. an emulsion of an aqueous phase, such a monomeric material, an emulsifying agent, a phenylcyclohexane hydroperoxide prepared by oxidation with free oxygen of phenylcyclohexane in an amount between 0.1 and 10 millimols, and 0.1 to 5 parts of an activating-reducing composition, said amounts being per 100 parts by weight of said monomeric material.

10. The process which comprises polymerizing a mixture of butadiene-1,3 and styrene at a temperature below 0° C. in aqueous emulsion in the presence of methanol, an emulsifying agent, a ferrous pyrophosphate complex activator and as the catalyst a phenylcyclohexyl hydroperoxide in which the hydroperoxy group is attached to that carbon atom in the cyclohexyl ring which is attached to the phenyl ring.

11. The process which comprises polymerizing a mixture of butadiene-1,3 and styrene at a temperature below 0° C. in aqueous emulsion in the presence of methanol, an emulsifying agent, an activating-reducing composition comprising a ferrous compound, and as the catalyst a phenylcyclohexyl hydroperoxide in which the hydroperoxy group is attached to that carbon atom in the cyclohexyl ring which is attached to the phenyl ring.

References Cited in the file of this patent

Vandenberg et al.: "Ind. and Eng. Chem.," volume 40, No. 5, May 1948, pages 932–937.